June 21, 1949.  H. M. TALLEY  2,474,075
WELDING APPARATUS

Filed May 7, 1948  2 Sheets-Sheet 1

INVENTOR.
HYRUM M. TALLEY,
BY Hazard & Miller
ATTORNEYS.

June 21, 1949. H. M. TALLEY 2,474,075
WELDING APPARATUS
Filed May 7, 1948 2 Sheets-Sheet 2

INVENTOR.
HYRUM M. TALLEY,
BY Hazard & Miller
ATTORNEYS.

Patented June 21, 1949

2,474,075

UNITED STATES PATENT OFFICE 2,474,075

WELDING APPARATUS

Hyrum M. Talley, Alhambra, Calif.

Application May 7, 1948, Serial No. 25,730

5 Claims. (Cl. 219—8)

This invention relates to an apparatus for electric welding.

An object of the invention is to provide an apparatus that is suitable for electric welding circular seams such as those seams between a nipple flange or the like and a tank head.

More specifically, an object of the invention is to provide an apparatus consisting of a work support that is rotatably driven to rotate the work about a substantially vertical axis and which has associated therewith a pivoted arm carrying a hopper and through which an arc welding rod is fed, the arm being so arranged as to swing the hopper and welding rod through a path that is inclined to the axis of rotation of the work. A further characteristic of the arm is that its adjustment with relation to the work can be readily varied and when the welding operation is completed it may be swung into such a position as to empty the hopper of flux and discharge the flux in such a manner that it may be conserved.

Another object of the invention is to provide an apparatus comprising a work support for supporting work, a resilient arm swingably mounted adjacent the work support for swinging movement toward the work, and a stop against which the arm rests when in operating position, the resiliency of the arm permitting the arm to be swung toward the work in drawing an electric arc.

With the foregoing and other objects in view, which will be made manifest in the following detailed description and specifically pointed out in the appended claims, reference is had to the accompanying drawings for an illustrative embodiment of the invention, wherein:

Figure 1:
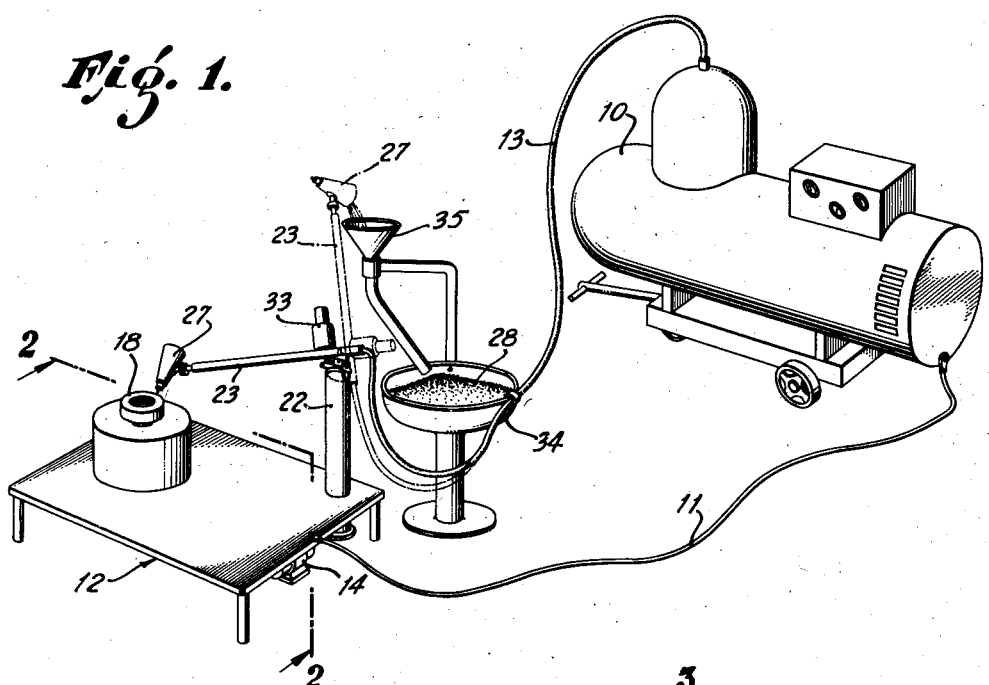
Figure 1 is a perspective view of the welding apparatus embodying the present invention.
Figure 2:
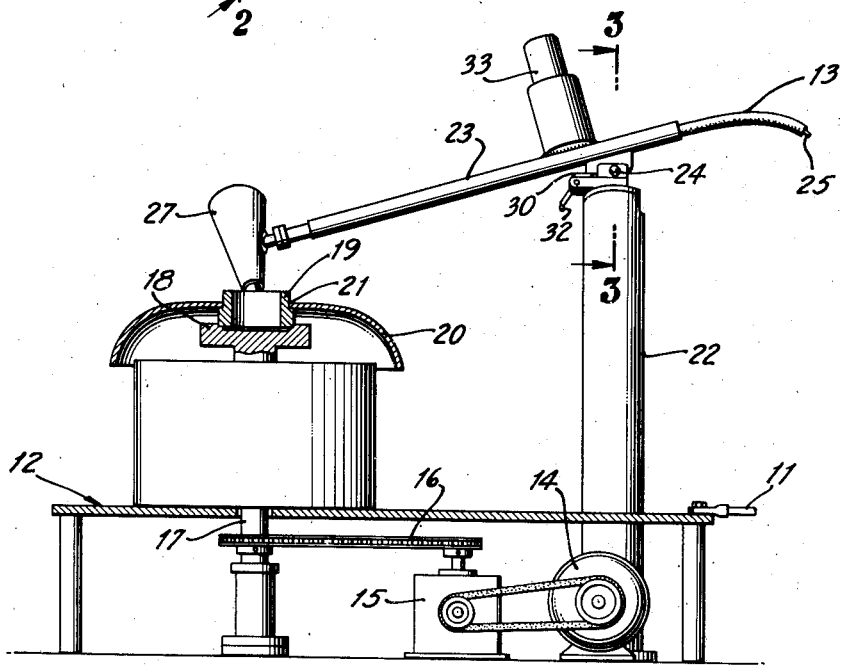
Fig. 2 is a sectional view taken substantially upon the line 2—2 upon Fig. 1.

Referring to the accompanying drawings wherein similar reference characters designate similar parts throughout, 10 indicates a conventional automatic electric welder from which a conductor 11 leads to a work table or support indicated at 12 to thus ground the work. 13 indicates a conduit through which the welding wire which constitutes the welding electrode is fed from the welder 10. Beneath the work table 12 there is a suitable source of power such as an electric motor 14 which drives through a gear box 15, a chain 16 that is trained over a sprocket on a vertical shaft 17. This shaft has a head thereon indicated at 18 on which a nipple, flange or similar article, indicated at 19, is adapted to be supported and on which there may be positioned a tank head 20 that is to be welded to the nipple at 21. When the motor 14 is operated or energized the shaft 17 will be rotated about a vertical axis carrying with it in its rotation the nipple 19 and the tank head 20 so that these parts are slowly rotated as the welding operation proceeds.

Figure 3:
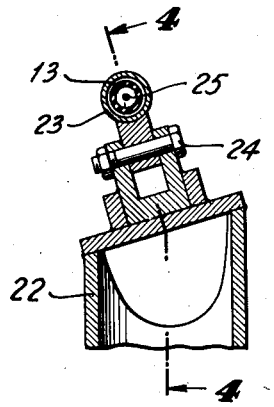
Fig. 3 is a vertical section taken substantially upon the line 3—3 upon Fig. 2.
Figure 4:
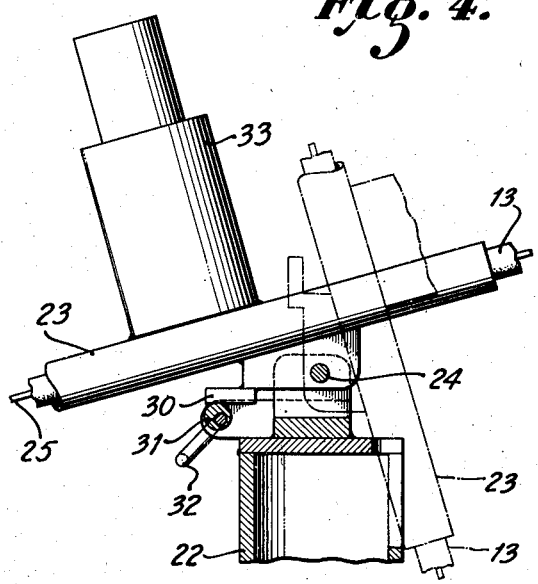
Fig. 4 is a view taken approximately upon the line 4—4 upon Fig. 3.
Figure 6:
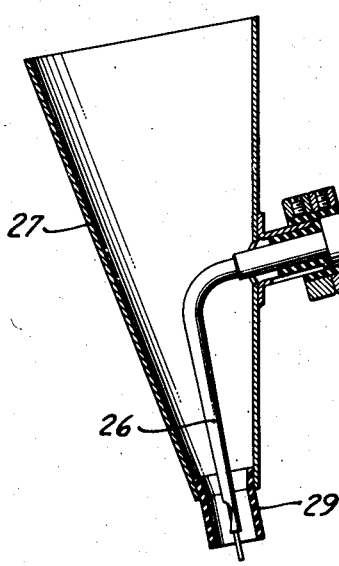
Fig. 6 is a sectional view through the hopper taken substantially upon the line 6—6 upon Fig. 5.
Figure 5:
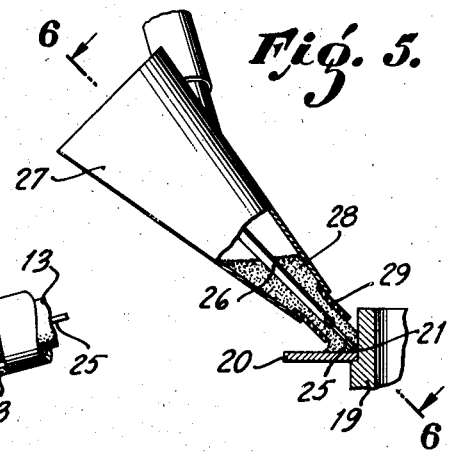
Fig. 5 is a view in end elevation, parts being broken away and shown in section illustrating the hopper.

On the table 12 I provide a suitable pedestal 22 on which an arm 23 is pivotally mounted as at 24. The conduit 13 which contains the insulated welding wire or welding electrode extends into the hollow arm 23 and this wire, indicated at 25, issues from the arm through a ferrule 26. The ferrule 26 is surrounded by a conical hopper 27 adapted to contain an adequate supply of welding flux 28 which is fed by gravity from the hopper through an outlet ferrule 29, formed of rubber or other electric non-conducting material. It will be understood by those familiar with the art that the present invention contemplates forming the weld between the head 20 and the nipple 19 by the submerged arc method of electric welding wherein the end of the electrode has the electric arc drawn between the electrode and the work completely smothered or submerged in surrounding flux. As will be noted from an inspection of Fig. 3, the axis of the pivot 24 is inclined to the horizontal so that the arm 23 swings downwardly and laterally toward the center of rotation of the work. An adjustment is provided for adjusting the arm with relation to the work and to this end a stop 30 is provided on the arm adjacent the pivot 24 which is engageable with an eccentric 31 that is shiftable by means of a handle 32. Thus, on rotating the eccentric by means of its handle the position of the arm may be adjusted so as to properly space it from the work to enable a proper length of arc to be drawn. A weight 33 is carried by the arm so as to urge the arm into either of two extreme positions that it may assume with relation to the support or pedestal 22. As part of the apparatus there may be provided a suitable container for flux indicated at 34 carrying a funnel 35 that is so positioned that when the arm 23 is swung upwardly into its uppermost position to empty flux from the hopper 27, the flux will be deposited in the funnel and returned to the container 34. The arm 23 possesses some small degree of resiliency and in welding with the apparatus as above described the work 19 and 20 is first positioned on the head 18 of the shaft 17. The motor 14 may then be energized to start rotation of the shaft and a supply of the flux from the container 34 can be positioned in the hopper 27. The stop 30 and the eccentric 31 are so adjusted that the end of the electrode 25 issuing from the ferrule 26 will be slightly spaced from the seam that is to be welded between the nipple and the tank head. In drawing the arc I rely on the resiliency of the arm 23 and merely press or spring this arm slightly so as to establish a contact between the end of the electrode 25 and the work. When the arc is thus established the arm 23 is released and on returning to its normal position the arc will be drawn. The welding operation then proceeds around the nipple 19 it being understood that the work is constantly rotated by the motor 14. In the course of the welding, flux is constantly fed by gravity from the hopper 27 and as the welding wire 25 is consumed the automatic welder 10 continues to feed the wire to and through the ferrule 26. When the welding operation is completed by one complete revolution of the work the arm 23 is swung upwardly and away from the work thus breaking the arc between the welding wire and the work and causing the flux remaining in the hopper 27 to be emptied therefrom into the funnel 35 as illustrated by dotted lines on Fig. 1. The weight 33 having swung over the pivot 24 will retain the arm in this position until new work is applied to the head 18 after which the arm 23 may be returned to its normal position and the welding operation repeated.

It will be noted that the non-conducting ferrule 29 forms an insulating barrier between the lower or narrow end of the hopper 27 and the electrode so that arcing is confined between the electrode and the work and cannot take place between the electrode and the hopper.

The advantages of submerged arc welding have heretofore been generally recognized but this method of welding has generally been confined to flat plate welding or welding seams between abutting cylinders. The improved apparatus permits of this type of welding to be used on annular seams disposed in a single horizontal plate such as is occasioned between nipples and similar fittings that are welded into tank heads.

Various changes may be made in the details of construction without departing from the spirit and scope of the invention as defined by the appended claims.

I claim:

1. A welding apparatus comprising supporting means on which the work is adapted to be positioned, means for rotating the supporting means about a vertical axis, a resilient arm pivotally mounted adjacent the supporting means for swinging movement downwardly and toward the axis of rotation of the work, means providing a stop against which the arm rests in operating position, the resiliency of the arm permitting the arm to be sprung toward the work to a position beyond that permitted by the stop when the arm is unsprung in drawing an electric arc, a hopper carried by the arm adapted to contain flux to be discharged therefrom against the work, and means for feeding a welding electrode through the hopper and the flux therein.

2. A welding apparatus comprising supporting means on which the work is adapted to be positioned, means for rotating the supporting means, a resilient arm pivotally mounted adjacent the supporting means for swinging movement toward the work, means providing a stop against which the arm bears when in operating position, the resiliency of the arm permitting the end of the arm opposite the pivot to be sprung toward the work to position said end of the arm closer to the work than during normal operation of the apparatus in order to draw an electric arc, a hopper carried by the arm adapted to contain flux to be discharged therefrom against the work, and means for feeding a welding electrode through the hopper and the flux therein.

3. A welding apparatus comprising supporting means on which work is adapted to be positioned, a resilient arm swingably mounted adjacent the supporting means for swinging movement toward the work, means on the arm for feeding an arc welding rod and a flux toward the work to be welded, means providing a stop adjacent the pivot against which the arm bears when in operating position, the resiliency of the arm permitting the arm to be sprung toward the work to a position closer than that permitted by the stop when the arm is unsprung in drawing an electric arc, and means for causing relative movement between the supporting means and the arm.

4. A welding apparatus comprising supporting means on which the work is adapted to be positioned, means for rotating the supporting means, a hopper adapted to be positioned next the work and contain flux to be discharged therefrom against the work, means for feeding a welding electrode through the hopper and the flux therein, a single resilient tube providing an arm supported in cantilever fashion adjacent one end thereof adjacent the supporting means and supporting the hopper from the other end thereof, the cantilever arm being the entire support for the hopper, means providing a stop adjacent said one end of the arm against which the arm bears when in operation position, the resiliency of the arm permitting said other end of the arm to be sprung toward the work to position said other end of the arm closer to the work than permitted by the stop when the arm is unsprung in order to draw an electric arc.

5. A welding apparatus comprising supporting means on which work is adapted to be positioned, a resilient arm swingably mounted on a pivot adjacent the supporting means, the pivot having its axis at an angle to the vertical so that the arm swings over center during its swinging movement, stops for the arm arranged to allow the arm to be swung over center from an operative position next the work to an inoperative position away from the work, means on the arm for feeding an arc welding rod and a flux toward the work to be welded, and means for causing relative movement between the supporting means and the arm, the resiliency of the arm permitting the end of the arm closest the work to be sprung toward the work to a position closer than that permitted by the stops when the arm is unsprung in order to draw an electric arc.

HYRUM M. TALLEY.

REFERENCES CITED

The following references are of record in the file of this patent:

UNITED STATES PATENTS

| Number | Name | Date |
| --- | --- | --- |
| 2,259,976 | Howard | Oct. 21, 1941 |
| 2,283,140 | Johnston | May 12, 1942 |
| 2,314,917 | Baird | Mar. 30, 1943 |
| 2,357,376 | Baird | Sept. 5, 1944 |
| 2,402,937 | Stringham | June 25, 1946 |
| 2,438,593 | Wright | Mar. 30, 1948 |

FOREIGN PATENTS

| Number | Country | Date |
| --- | --- | --- |
| 394,773 | Great Britain | July 6, 1933 |